(12) United States Patent
Nagai

(10) Patent No.: US 6,506,487 B2
(45) Date of Patent: Jan. 14, 2003

(54) LAMINATED GLASS

(75) Inventor: Kuniko Nagai, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/951,513

(22) Filed: Sep. 14, 2001

(65) Prior Publication Data

US 2002/0054993 A1 May 9, 2002

(30) Foreign Application Priority Data

Sep. 14, 2000 (JP) ........................................ 2000-279881

(51) Int. Cl.$^7$ ........................... B32B 17/10; C03C 27/12
(52) U.S. Cl. ........................ 428/329; 428/328; 428/438; 428/437; 501/68; 501/69
(58) Field of Search ................................. 428/328, 329, 428/436, 437; 501/68, 69

(56) References Cited

U.S. PATENT DOCUMENTS

| 5,518,810 A | 5/1996 | Nishihara et al. ........... 428/328 |
| 5,830,568 A | 11/1998 | T. Kondo ..................... 428/328 |
| 5,849,402 A | * 12/1998 | Kraemling et al. ......... 428/220 |

FOREIGN PATENT DOCUMENTS

| EP | 0 727 306 | 8/1996 |
| EP | 1 136 457 | 9/2001 |
| JP | 2-111644 | 4/1990 |
| JP | 2715859 B2 | 3/1995 |
| JP | 8-259279 | 10/1996 |
| JP | 10-297945 | 11/1998 |
| WO | WO 91/07356 | 5/1991 |
| WO | WO 01/19748 | 3/2001 |

OTHER PUBLICATIONS

Yamane, et al., Nessen Kyushu Glass, pp. 442–443, "Glass Kougaku Handbook", Jul. 5, 2001.

* cited by examiner

Primary Examiner—D. S. Nakarani
(74) Attorney, Agent, or Firm—Oblon, Spivak, McClelland, Maier & Neustadt, P.C.

(57) ABSTRACT

A laminated glass comprising plural glass sheets and an interlayer interposed between the plural glass sheets, wherein the interlayer is an organic resin film having IR cutoff fine particles with diameters of at most 0.2 $\mu$m dispersed therein, the product of the solar transmittances of the respective glass sheets is from 0.3 to 0.6, and the content of the IR cutoff fine particles dispersed in the interlayer is from 0.1 to 0.5 parts by mass in relation to 100 parts by total mass of the interlayer.

16 Claims, 3 Drawing Sheets

LAMINATED GLASS

BACKGROUND OF THE INVENTION

1. Field of the Invention

The invention relates to a laminated glass.

2. Description of the Background

In recent years, infrared shielding glass windowpanes have been used as automobile windowpanes increasingly to decrease the temperature rise in the compartment and the load on the air conditioner. As infrared shielding windowpanes, thin film-deposited glass sheets having thin films of various metals and metal oxides layered on the glass surfaces have been used conventionally, and these films can considerably block the entry of solar energy into the car compartment.

However, these electroconductive films can impair the function of the windowpane as a radio, TV or GPC (Global Positioning System) antenna by lowering the radio wave transmittance of the windowpane. An antenna of this kind is made of a wiring pattern (of a sintered electroconductive ceramic paste or the like) printed on the interior side of the rear windowpane. Therefore, windowpanes have to have high radio wave transmittance in order to function as an antenna.

[Prior Art 1]

As a solution to this problem, a laminated glass that transmits radio waves as well as intercepts infrared rays is proposed in JP-A-8-259279 (hereinafter referred to as '279 publication). The laminated glass has an interlayer in which functional fine particles with particle diameters of at most 0.2 µm are dispersed, and is supposed to not only intercept infrared rays but also suppress radio interference.

As one embodiment, the '279 publication discloses a laminated glass comprising a 2 mm-thick clear glass sheet, and a 2 mm-thick green glass sheet bonded via an interlayer having ITO fine particles dispersed therein (in an amount of about 0.3 part by mass (≈0.2×7÷(7+95÷323)×100) in relation to 100 parts by total mass of the interlayer) in Example 6. The laminated glass realizes a satisfactory solar transmittance Ts, 42.0%, and a haze H as low as 0.2%.

However, the content of ITO fine particles in Example 6 is too low to satisfactorily suppress near infrared transmittance and allows the surface temperatures of the car seats and the steering wheel and the temperature of the car compartment to rise.

[Prior Art 2]

On the other hand, the relation between IR cutoff properties and the amount of fine particles is described in the publication of Japanese Patent No. 2715859 (hereinafter referred to as '859 publication). The publication mentions an infrared cutoff material comprising an organic resin and ITO powder dispersed therein and shows the relation between IR cutoff properties and the amount of ITO powder added in FIG. 1.

When the plots for Example 3 in which 8 g of ITO powder was dispersed in a solvent containing 10 g of an acrylic resin solution, and Example 4, in which 8 g of ITO powder was dispersed in a solvent containing 4 g of an acrylic resin solution, shown in the figure are compared, it is apparent that the large discrepancy between the plots for Examples 3 and 4 is attributable to the fact that the proportion of ITO powder to the resin was larger in Example 4 than in Example 3.

It is also apparent from the graph shown in FIG. 1 of the '859 publication that the proportion of ITO powder has little influence on the light shielding properties at mid infrared wavelengths around 1500 nm (transmittance: about 5% in Example 3 and about 1% in Example 4) but does have influence at near infrared wavelengths around 1000 nm (transmittance: about 22% in Example 3 and 3% in Example 4). Therefore, the light shielding properties at near infrared wavelengths around 1000 nm improves as the proportion of ITO powder increases.

However, improvement of the light shielding properties by increase of the proportion of ITO powder can cause trouble with various communications systems using infrared rays.

For example, the VICS (Vehicle Information and Communication System) using light beacons is becoming popular in recent years in Japan. This system sends traffic information collected by an information center to automobiles and, in turn, sends information from the automobiles to the information center to prevent traffic jams. Specifically speaking, it allows interactive communications by infrared rays between devices installed on the roadside (hereinafter referred to as roadside antenna) and devices mounted on vehicles (hereinafter referred to as in-vehicle devices).

The keyless entry system allows car owners to open or close the car doors by sending infrared signals to the optical receiver installed in the car. Therefore, for proper operation of these systems, windowpanes have to transmit infrared rays, especially infrared rays at wavelengths around 850 nm which are used in these systems.

For this reason, automobile windowpanes have to satisfactorily transmit infrared rays at wavelengths around 850 nm. However, heat shielding by addition of ITO powder is problematic because the ITO powder added cuts off infrared rays at wavelengths around 850 nm as well as around 1000 nm. An interlayer having plenty of fine particles such as ITO powder particles dispersed therein has a problem of low transparency and leads to increase in the haze of the resulting laminated glass. Increase in haze worsens makes a driver's vision worse.

As is evident from the above discussion, windowpanes that not only block infrared rays at wavelengths of from 1000 to 1100 nm contributory to temperature rise in the car compartment but also transmit infrared rays at wavelengths around 850 nm used for infrared communications are demanded as automobile windowpanes. However, sufficient interception of infrared rays within the wavelength range from 1000 to 1100 nm requires addition of a large proportion of ITO fine particles, which interferes with infrared communications systems by intercepting infrared rays at wavelengths about 850 nm as well and can cause another problem of increase in haze.

SUMMARY OF THE INVENTION

The present invention solves these problems with the prior art and primarily aims at providing a laminate glass which not only cuts off infrared rays at wavelengths of from 1000 to 1100 nm contributory to rise in indoor temperature but also transmits infrared rays at wavelengths about 850 nm used for infrared communications.

The present invention secondarily aims at providing a laminated glass with an improved appearance by suppressing increase in haze due to addition of ITO powder.

To attain these objects, the present invention provides a laminated glass comprising plural glass sheets and an interlayer interposed between the plural glass sheets, wherein the interlayer is an organic resin film having IR cutoff fine particles with diameters of at most 0.2 µm dispersed therein, the product of the solar transmittances of the respective glass sheets is from 0.3 to 0.6, and the content of the IR cutoff fine particles dispersed in the interlayer is from 0.1 to 0.5 parts by mass in relation to 100 parts by total mass of the interlayer.

According to one embodiment of the present invention, the present invention provides a laminated glass according to Claim 1, wherein the solar transmittances are determined in accordance with the Japanese Industrial Standards (JIS) R3106-1998.

DETAILED DESCRIPTION OF THE INVENTION

Figure 1:
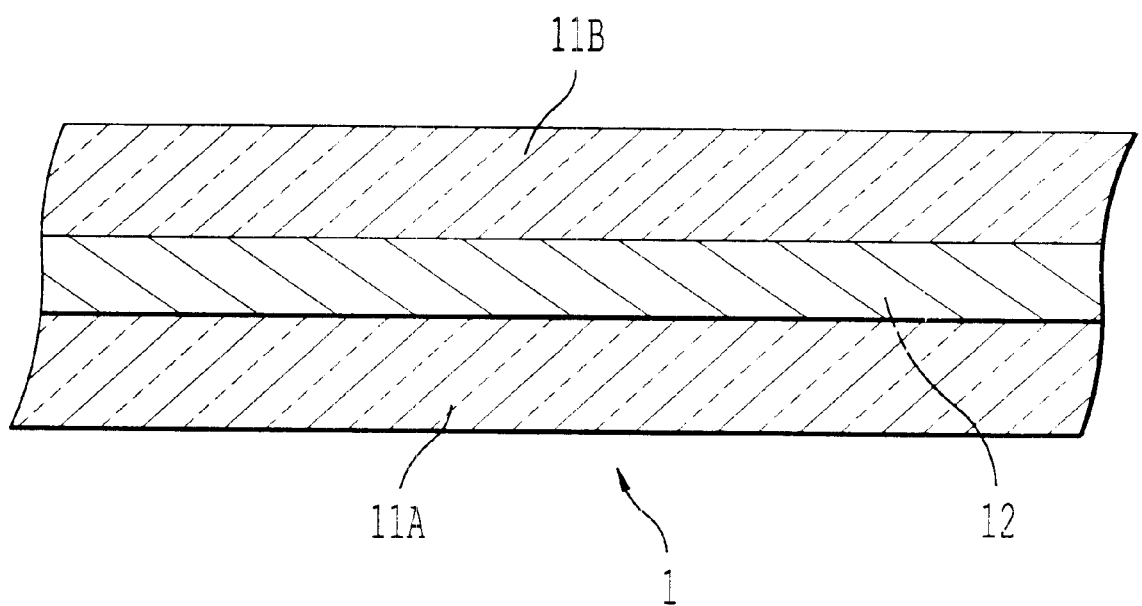
FIG. 1 is a schematic sectional view of one embodiment of the laminated glass of the present invention.

Now, the mode of carrying out the present invention is described by referring to the drawings.

[1. The Structure of the Laminated Glass]

FIG. 1 is a schematic sectional view of one embodiment (of the laminated glass) of the present invention. The laminated glass 1 is produced by bonding two glass sheets 11a and 11b and an interlayer 12 interposed therebetween into one by pressing in an autoclave. The interlayer 12 is made of a polyvinylbutyral film or an ethylene-vinyl acetate film and IR cutoff fine particles with particle diameters of at most 0.2 $\mu$m (preferably from 0.001 to 0.15 $\mu$m) dispersed in the film.

[2. Preparation of the Interlayer]

Now, the process for producing the interlayer will be described. IR cutoff fine particles with particle diameters of at most 0.2 $\mu$m are dispersed in a plasticizer, and the plasticizer in the form of a dispersion is added to a resin solution and kneaded to obtain a raw film resin. Then, the raw film resin is molded, for example, by extrusion to obtain an interlayer having the IR cutoff fine particles dispersed therein.

At the time of addition of a plasticizer, various additives may be added to the resin solution. As the additives, various pigments, organic UV absorbers and organic infrared absorbers may, for example, be mentioned. As the plasticizer, already known ones may be used.

[3. The Constituent of the IR Cutoff Fine Particles]

Concerning the constituent, the IR cutoff fine particles may be, for example, fine particles made of a metal, an oxide, a nitride or a sulfide of Sn, Ti, Si, Zn, Zr, Fe, Al, Cr, Co, Ce, In, Ni, Ag, Cu, Pt, Mn, Ta, W, V or Mo which may be doped with Sb or F, and may be made of a single species or more than one species. It is helpful to use a single species or more than one species of particles mixed or coated with an organic resin to attain various properties necessary for automobile windowpanes.

It is preferred to use fine particles of tin oxide doped with antimony (ATO) or indium oxide doped with tin (ITO) as the IR cutoff fine particles because the excellent IR cutoff properties of ATO fine particles and ITO fine particles make it possible to reduce the amount of the IR cutoff fine particles in the interlayer. Because ITO fine particles are even more excellent than ATO fine particles in IR cutoff properties, ITO fine particles are particularly preferable as the IR cutoff particles.

On the other hand, it is necessary to disperse a certain amount of IR cutoff fine particles in the interlayer in order to obtain the desired IR cutoff properties. However, addition of plenty of fine particles results in increase in the haze of the interlayer. Therefore, the amount of IR cutoff fine particles dispersed in the interlayer is preferably from 0.1 to 0.5 part by mass in relation to 100 parts by total mass of the interlayer to keep the haze of the interlayer low.

However, because with this proportion range, light shielding properties is not satisfactory at near infrared wavelengths (especially around 1000 nm), though it is satisfactory at mid infrared wavelengths (from 1500 to 5000 em) (see Laminated Glass Example 5 shown in FIG. 3A and Laminated Glass of Example 22 shown in FIG. 3B which appear later), further elaboration is required as described below.

[4. The Constituent of the Glass Sheets]

Soda-lime-silica glass, which contains more iron than ordinary float glass, should be used for at least one of the glass sheets 11a and 11b so that the IR cutoff properties can be maintained even with a small amount of IR cutoff fine particles by letting the glass sheets absorb near infrared rays. Specifically, the iron content has to be adjusted so that the product of the solar transmittances of the glass sheets 11a and 11b determined in accordance with JIS R3106-1998 is from 0.3 to 0.6. When ITO fine particles are used as the IR cutoff fine particles, the iron content has to be adjusted so that the sum of the total iron contents of the respective glass sheets in a 1 cm$^2$ piece of the laminated glass is from 2 to 7 mg (preferably from 3 to 6 mg) in terms of $Fe_2O_3$. In this case, it is particularly preferred that the sum of the FeO contents of the respective glass sheets in the piece of the laminated glass is from 0.5 to 2.5 mg because more than 70% of the infrared rays at a wavelength of 1100 nm can be cut off.

The specific composition of the soda-lime-silica glass is preferably such that iron is added to a matrix glass for soda-lime-silica glass in a total amount of from 0.2 to 1% by mass in terms of $Fe_2O_3$. Because among the total iron, bivalent iron accounts for most of the near infrared absorption, it is preferred that the mass of FeO (bivalent iron) in terms of $Fe_2O_3$ is from 20 to 40% of the total mass of iron in terms of $Fe_2O_3$.

Hereinafter, "the mass of FeO in terms of $Fe_2O_3$" is referred to simply as "the mass of FeO", and "the FeO content" has the same meaning. "The mass of the total iron in terms of $Fe_2O_3$" is referred to simply as "the total mass of iron", and "the total iron content" has the same meaning.

[5. The Properties of a Piece of the Laminated Glass]

A 1 cm$^2$ piece of the laminated glass will be described below.

Figure 2A:
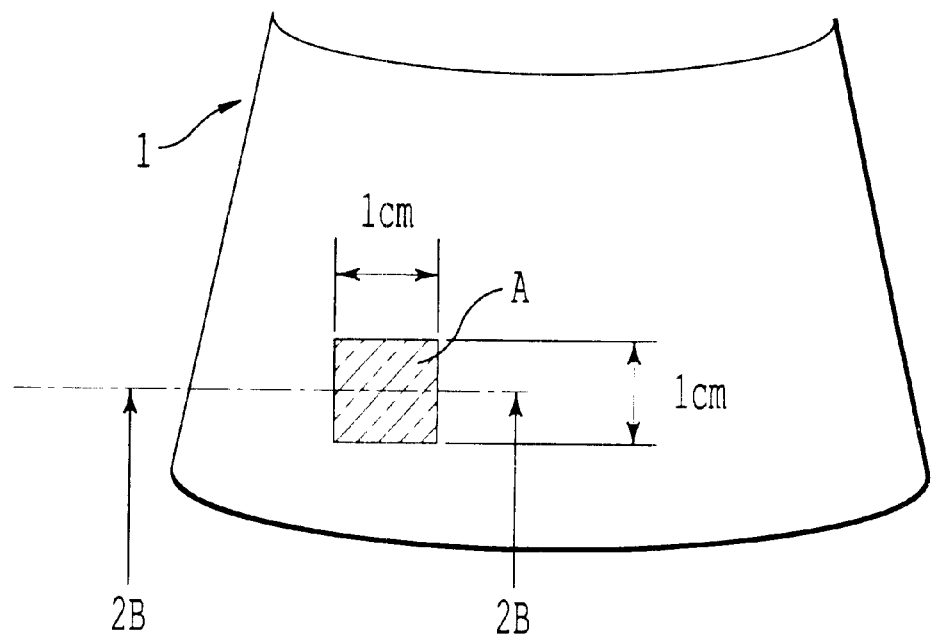
FIG. 2A is a front view of a laminated glass.
Figure 2B:
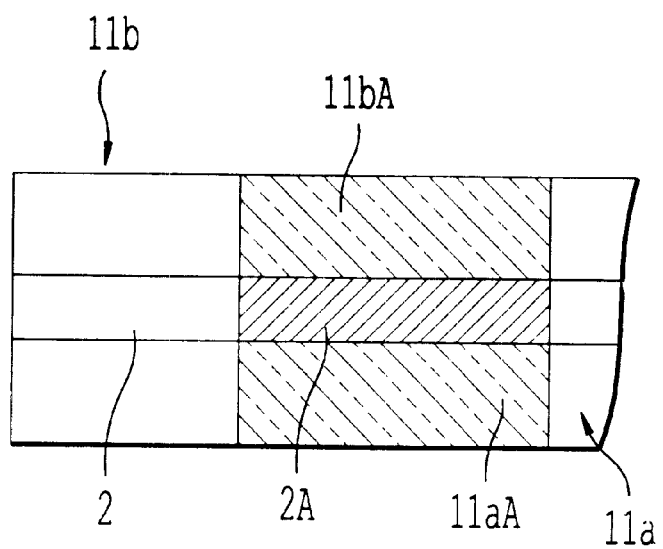
FIG. 2B is an enlarged sectional view along the B-B' line.

FIG. 2A is a front view of the laminated glass and a piece of the laminated glass to be cut out of it. FIG. 2B is an enlarged sectional view along the line B-B'. The edge face of an imaginary 1 cm$^2$ square on the surface of the laminated glass 1 shown in FIG. 2A would consist of the glass sheet 11aA, the interlayer 2A and the glass sheet bA as shown in FIG. 2B.

Therefore, the sum of the iron contents of the respective glass sheets in the piece of the laminated glass A means the sum of the iron content of the glass sheet 11aA and the iron content of the glass sheet 11bA. Likewise, the sum of the FeO contents of the respective glass sheets in the piece of the laminated glass A means the sum of the FeO content of the glass sheet 11aA and the FeO content of the glass sheet 11bA. The content of the ITO fine particles in the interlayer in the piece of the laminated glass, which will be mentioned later, means the content of the ITO fine particles in the interlayer 2A.

Figure 3A:
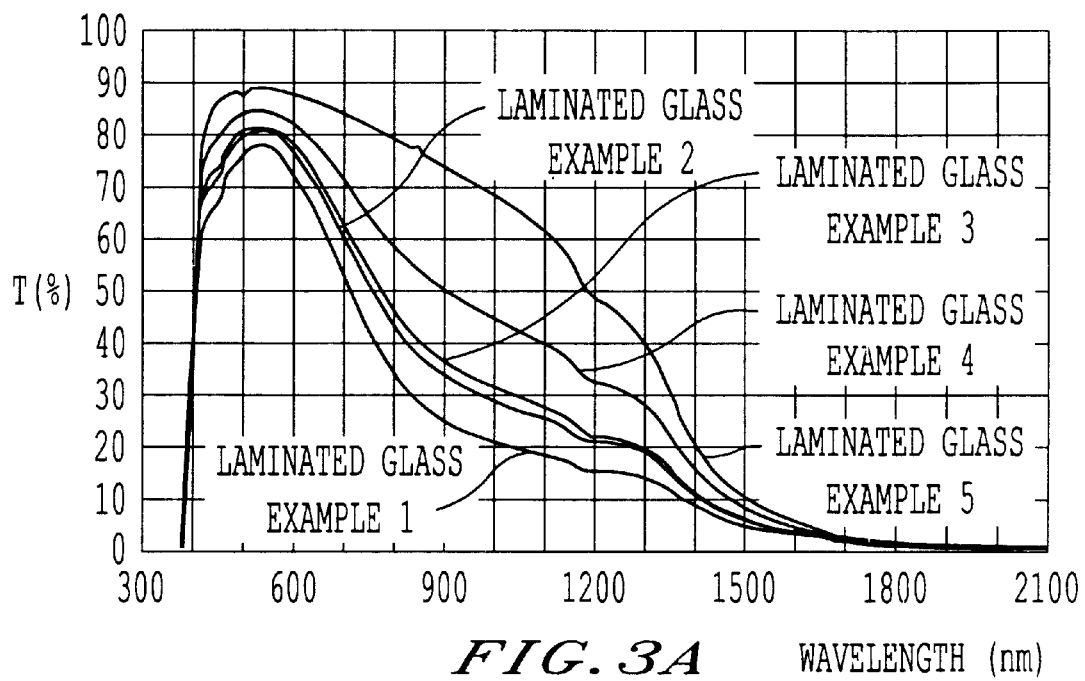
FIG. 3A is a graph of the spectral transmittances of the laminated glasses Examples 1 to 5.

Because iron, FeO and ITO fine particles are basically supposed to be dispersed evenly in the laminated glass, the location of the piece of the laminated glass A is not limited as shown in FIG. 3A and may be anywhere in the laminated glass 1.

The reason why it is preferred that the sum of the FeO contents of the respective glass sheets in the piece of the laminated glass is from 0.5 to 2.5 mg is explained below. For the normal operation of light beacons, the laminated glass has to sufficiently transmit infrared rays around 850 nm. If the sum of the FeO contents of the respective glass sheets in the piece of the laminated glass exceeds 2.5 mg, the laminated glass cuts off more than 25% of the infrared rays at the wavelength of around 850 nm. Conversely, if the sum of the FeO contents of the respective glass sheets in the piece of the laminated glass is less than 0.5 mg, plenty of IR cutoff fine particles have to be added at the expense of higher haze to reduce the solar transmittance of the laminated glass to 50% or below. Therefore, it is preferred that the sum of the FeO contents of the respective glass sheets in the piece of the laminated glass is from 0.5 to 2.5 mg.

Next, the reason for the preference for ITO fine particles as the IR cutoff fine particles is explained. When the sum of the FeO contents of the respective glass sheets in the piece of the laminated glass is from 0.5 to 2.5 mg, it is preferred that the content of ITO fine particles in the interlayer in the piece of the laminated glass is from 0.1 to 0.5 mg.

The reason is as follows. The FeO content and the content of ITO fine particles in the piece of the laminated glass affect the amount of solar radiation that penetrates the laminated glass per unit area. Meanwhile, the proportion of ITO fine particles dispersed in the interlayer has to be from 0.1 to 0.5 part by mass in relation to 100 parts by total mass of the interlayer to keep the haze of the interlayer low. If the thickness of the interlayer is in the range of from 0.3 to 1.0 mm, the content of ITO fine particles in the interlayer in the piece of the laminated glass is about from 0.05 to 0.5 mg. If the piece of the laminated glass contains less than 0.1 mg of ITO fine particles in the interlayer, 90% or more of infrared rays at a wavelength of 1100 nm permeate. Therefore, it is preferred that the content of ITO fine particles in the interlayer in the piece of the laminated glass is at least 0.1 mg so that infrared rays at a wavelength of 1100 nm are cut off sufficiently.

Incorporation of about 2.5 mg of FeO and at least 0.1 mg of ITO per piece of the laminated glass makes it possible to cut off at least 80% of infrared rays at a wavelength of 1100 nm.

In the meantime, the ITO fine particles dispersed in the interlayer have little influence on the infrared transmittance at a wavelength of about 850 nm. That means that the FeO content determines the infrared transmittance at a wavelength of about 850 nm as long as the proportion of ITO fine particles is enough small not to impair the haze of the laminated glass. Addition of FeO leads to decrease in the infrared transmittance at 1100 nm and at 850 nm. Incorporation of from 0.5 to 2.5 mg of FeO and from 0.1 to 0.5 mg of ITO per piece of the laminated glass secures an infrared transmittance of at least 30% and hence is preferable for the normal operation of light beacons.

When the product of the solar transmittances of the respective glass sheets in the laminated glass determined in accordance with the JIS R3106-1998 is from 0.3 to 0.6, the solar transmittance of the laminated glass with an interlayer having from 0.1 to 0.5 part by mass of IR cutoff fine particles dispersed therein in relation to 100 parts by total mass of the interlayer can be lowered to 50% or below. The product of the solar transmittances means the product of the solar transmittances (the $1/100$ fractions of the percent solar transmittances) of the respective glass sheets in the laminated glass.

In addition, it is preferred that the product of the light transmittances of the respective glass sheets in the laminated glass at the wavelength of 1100 nm is from 0.15 to 0.5 to keep the haze of the laminated glass low and provide sufficient IR cutoff properties to the laminated glass. The product of the light transmittances at the wavelength of 1100 nm means the product of the transmittances (the $1/100$ fractions of the percent solar transmittances) of the respective glass sheets in the laminated glass.

In embodiments of the present invention, the infrared transmittances at various wavelengths such as 1100 nm and 850 nm are obtained from the spectral transmittances determined in accordance with JIS R3106-1998. The spectral transmittance of the interlayer is measured basically by the same method as for the glass sheets and the laminated glass and may be measured after thermal leveling in the cases of embossed interlayers.

(Glass Sheet Composition 1)

Nevertheless, glass sheets of the following composition may be used for at least one of the glass sheets in the laminated glass. Glass sheets characterized by UV transmittances measured in accordance with ISO-9050 of at most 30%, visible light transmittances under CIE standard illuminants A of at least 70%, dominant wavelengths of from 480 to 570 nm and excitation purities under CIE standard illuminants A of at most 6% at the actual thicknesses are preferably used.

Glass sheets having the above-mentioned characteristics are obtained from soda-lime-silica glass substantially having the following mass percent composition, namely $SiO_2$: 65–75%, $Al_2O_3$: 0.1–5%, $Na_2O+K_2O$: 10–18%, CaO: 5–15%, MgO: 1–6%, $SO_3$: 0.05–2%, total iron in terms of $Fe_2O_3$: 0.3–1%, total cerium in terms of $CeO_2$ or/and $TiO_2$: 0.5–2%.

Glass sheets having the above-mentioned characteristics have infrared absorbency and therefore can provide a laminated glass having sufficient IR cutoff properties even if the content of IR cutoff fine particles in the interlayer is small. As a result, it is possible to reduce the haze of the interlayer and improve the appearance of the laminated glass.

(Glass Sheet Composition 2)

Further, glass sheets characterized by UV transmittances measured in accordance with ISO-9050 of at most 15%, visible light transmittances under CIE standard illuminants A of at least 70%, dominant wavelengths of from 480 to 570 nm and excitation purities under CIE standard illuminants A of at most 6% at the actual thicknesses have the following effects. Namely, a laminated glass using such glass sheets can have both IR cutoff properties and US cutoff properties without increase in haze accompanying addition of IR cutoff fine particles.

The UV transmittance of such a glass sheet is measured in accordance with ISO-9050 at the actual thickness and is at most 30% (preferably at most 15%). The dominant wavelength of such a glass sheet measured in accordance with JIS Z8701-1982 is from 480 to 570 nm (preferably from 500 to 540 nm). The excitation purity of such a glass sheet at the actual thickness is measured under CIE standard illuminants A in accordance with JIS Z8701-1982 and is at most 6%. JIS is short for Japanese Industrial Standards.

(The Thicknesses of Glass Sheets)

In embodiments of the present invention, the thickness of each glass sheet is preferably from 1.2 to 5 mm. The thickness of the plural glass sheets may be the same or different. When the plural glass sheets have the same thickness, the thickness is preferably from 1.7 to 3 mm. When the plural glass sheets have different thickness, it is preferred that the thinner glass sheet has a thickness of from 1.2 to 2.5 mm, and the thicker one has a thickness of from 2 to 5 mm.

In the embodiment illustrated in FIG. 1, the laminated glass 1 comprises two glass sheets and an interlayer interposed between them. The laminated glass may comprise more than two glass sheets and interlayers interposed therebetween (glass sheet/interlayer/glass sheet/. . ./interlayer/glass sheet). In this case, at least one of the plural interlayers should be an interlayer having IR cutoff fine particles dispersed therein. When the laminated glass comprises at least three glass sheets, the sum of the total iron contents or the FeO contents of the respective glass sheets constituting a piece of the laminated glass corresponds to the sum of the total iron contents or the FeO contents of the respective glass sheets in a piece of the laminated glass. As described above, in embodiments of the present invention, the individual glass sheets in the laminated glass may have the same characteristics or different characteristics.

[6. The Appearance of the Laminated Glass]

When used as a laminated glass for an automobile windowpane, the laminated glass which embodies the present invention preferably comprises glass sheets having different characteristics. It is especially preferred that the FeO content of the glass sheet on the exterior side is higher than that of the glass sheet on the interior side for the following reason. A laminated glass in which the glass sheet on the exterior side is darker than the glass sheet on the interior side (hereinafter darkness means relative darkness when referred to for the glass sheets on the interior and exterior sides) visually matches with the body of an automobile when used as a laminated glass for an automobile window, because from the outside of an automobile, the windowpane looks like a dent as if the surface of the window sat back to the position of the glass sheet on the interior side.

Placing a dark glass sheet on the interior side makes a car compartment look spacious because from the inside of an automobile, the windowpane looks like a dent as if the surface of the window sat back to the position of the glass sheet on the exterior side.

The laminated glass which embodies the present invention can provide a windowpane having a larger sheet resistance than conventional ones because no thin metal or metal oxide film has to be formed on the glass surface. Therefore, the laminated glass which embodies the present invention transmits radio waves and is suitable as an automobile windowpane. The sheet resistances of the glass sheets in embodiments of the present invention are preferably, for example, at least 20 kΩ/□, in particular at least 10 MΩ/□.

EXAMPLES

Now, specific Examples of the present invention will be explained. However, the present invention is by no means restricted to those specific Examples.

Interlayer Example 1

10 g of 3 GH (triethylene glycol bis(2-ethyl butyrate)) containing ITO fine particles (particle diameters of at most 0.02 μm) dispersed therein (the amount of the ITO fine particles was 1 g), 130 g of ordinary 3 GH and 360 g of a PVB (polyvinylbutyral) resin were obtained. The PVB resin was kneaded and mixed with the 3 GH with a three-roll mixer under heating at about 70° C. for about 15 minutes. The resulting raw film resin was heated to about 190° C. and molded through an extruder into film having a thickness of about 0.8 mm and wound up on a roll as Interlayer Example 1.

Interlayer Example 2

The same procedure as in Example 1 was followed except that the amount of the ITO fine particles was changed from 1 g to 1.25 g to obtain an Interlayer Example 2.

Interlayer Example 3

The same procedure as in Example 1 was followed except that the amount of the ITO fine particles was changed from 1 g to 1.5 g to obtain an Interlayer Example 3.

Interlayer Example 4

The same procedure as in Example 1 was followed except that the amount of the ITO fine particles was changed from 1 g to 1.75 g to obtain an Interlayer Example 4.

Interlayer Example 5

The same procedure as in Example 1 was followed except that the amount of the ITO fine particles was changed from 1 g to 2.5 g to obtain an Interlayer Example 5.

Glass Sheet Examples 1 to 3

Three kinds of glass sheets of 1000×1500 (mm) in size and 2 mm in thickness were obtained. The three kinds of glass sheets (Glass Sheet Examples 1 to 3) were substantially made of soda-lime-silica glasses of the compositions shown in Table 1 in percent by mass. Example 3 was made of ordinary colorless soda-lime-silica glass.

TABLE 1

| Composition | Glass sheet Example 1 | Glass sheet Example 2 | Glass sheet Example 3 |
| --- | --- | --- | --- |
| $SiO_2$ | 71 | 72.7 | 71.1 |
| $Al_2O_3$ | 1.7 | 0.10 | 1.48 |
| CaO | 8 | 8.8 | 8.9 |
| MgO | 3.5 | 3.85 | 4.04 |
| $Na_2O + K_2O$ | 12.8 | 13.7 | 13.9 |
| Total iron in terms of $Fe_2O_3$ (FeO in terms of $Fe_2O_3$) | 0.62 (0.20) | 0.54 (0.14) | 0.07 (—) |
| $CeO_2$ | 1.55 | — | — |
| $TiO_2$ | 0.35 | — | 0.10 |

Laminated Glass Examples 1 to 22

Then, laminated glasses for automobile windowpanes shown in Table 2 (Examples 1 to 22) were assembled from arbitrary combinations of Glass Sheet Examples and Interlayer Examples. The numerals in Table 2 correspond to those in FIG. 1 on the supposition that the glass sheet 11a was to be placed on the interior side, while the glass sheet 11b was to be placed on the exterior side.

TABLE 2

| Ex. | Glass sheet 11a | Interlayer | Glass sheet 11b |
|---|---|---|---|
| 1 | Glass Example 2 | Layer Example 1 | Glass Example 1 |
| 2 | Glass Example 2 | Layer Example 1 | Glass Example 2 |
| 3 | Glass Example 3 | Layer Example 1 | Glass Example 1 |
| 4 | Glass Example 3 | Layer Example 1 | Glass Example 2 |
| 5 | Glass Example 3 | Layer Example 1 | Glass Example 3 |
| 6 | Glass Example 3 | Layer Example 2 | Glass Example 2 |
| 7 | Glass Example 3 | Layer Example 2 | Glass Example 3 |
| 8 | Glass Example 2 | Layer Example 3 | Glass Example 1 |
| 9 | Glass Example 2 | Layer Example 3 | Glass Example 2 |
| 10 | Glass Example 3 | Layer Example 3 | Glass Example 1 |
| 11 | Glass Example 3 | Layer Example 3 | Glass Example 2 |
| 12 | Glass Example 3 | Layer Example 3 | Glass Example 3 |

TABLE 2-continued

| Ex. | Glass sheet 11a | Interlayer | Glass sheet 11b |
|---|---|---|---|
| 13 | Glass Example 2 | Layer Example 4 | Glass Example 1 |
| 14 | Glass Example 2 | Layer Example 4 | Glass Example 1 |
| 15 | Glass Example 2 | Layer Example 4 | Glass Example 2 |
| 16 | Glass Example 3 | Layer Example 4 | Glass Example 1 |
| 17 | Glass Example 3 | Layer Example 4 | Glass Example 2 |
| 18 | Glass Example 2 | Layer Example 5 | Glass Example 1 |
| 19 | Glass Example 2 | Layer Example 5 | Glass Example 2 |
| 20 | Glass Example 3 | Layer Example 5 | Glass Example 1 |
| 21 | Glass Example 3 | Layer Example 5 | Glass Example 2 |
| 22 | Glass Example 3 | Layer Example 5 | Glass Example 3 |

The transmittances of the Laminated Glass Examples 1 to 22 at wavelengths from 300 to 2100 nm were measured with a spectrophotometer (U4000, Hitachi, Ltd.) to obtain the visible transmittances Tv (%) and the solar transmittances Te (%) in accordance with JIS R3106-1998. The hazes H (%) of the laminated glasses were measured in accordance with JIS K6714.

The results are shown in Table 3. (1) in the table denotes the sum (mg) of the total iron contents of the respective glass sheets in a piece of a laminated glass. (2) denotes the sum of the FeO contents (mg) of the respective glass sheets in a piece of a laminated glass. (3) denotes the content (mg) of ITO fine particles in the interlayer in a piece of a laminated glass. (4) denotes the infrared transmittance (%) of a laminated glass at a wavelength of 1100 nm. (5) denotes the infrared transmittance (%) of a laminated glass at a wavelength of 850 nm. (6) denotes the product of the infrared transmittances of two glass sheets at a wavelength of 1100 nm. (7) denotes the product of the infrared transmittances of two glass sheets at a wavelength of 850 nm. (8) denotes the infrared transmittance (%) of an interlayer at a wavelength of 1100 nm. (9) denotes the infrared transmittance (%) of an interlayer at a wavelength of 850 nm. (10) denotes the product of the solar transmittances of two glass sheets. The hazes H, the infrared transmittances at 1100 nm and 850 nm ((4) to (9)) of Examples 6 to 17 are omitted.

TABLE 3

| EX. | $T_v$ | $T_e$ | H | (1) | (2) | (3) | (4) | (5) | (6) | (7) | (8) | (9) | (10) |
|---|---|---|---|---|---|---|---|---|---|---|---|---|---|
| 1 | 73.2 | 41.0 | 0.3 | 5.8 | 1.7 | 0.17 | 18.1 | 28.8 | 0.21 | 0.27 | 74.6 | 88.6 | 0.42 |
| 2 | 77.0 | 46.5 | 0.3 | 5.4 | 1.4 | 0.17 | 25.2 | 36.9 | 0.29 | 0.35 | 74.6 | 88.6 | 0.49 |
| 3 | 77.9 | 47.8 | 0.3 | 3.5 | 1.0 | 0.17 | 27.3 | 40.0 | 0.33 | 0.39 | 74.6 | 88.6 | 0.53 |
| 4 | 82.0 | 55.6 | 0.1 | 3.0 | 0.7 | 0.17 | 39.4 | 52.6 | 0.46 | 0.51 | 74.6 | 88.6 | 0.62 |
| 5 | 87.5 | 67.4 | 0.2 | 0.7 | — | 0.17 | 60.7 | 75.1 | 0.72 | 0.74 | 74.6 | 88.6 | 0.77 |
| 6 | 81.6 | 54.7 | — | 3.0 | 0.7 | 0.21 | — | — | — | — | — | — | 0.62 |
| 7 | 87.1 | 66.2 | — | 0.7 | — | 0.21 | — | — | — | — | — | — | 0.77 |
| 8 | 72.5 | 39.9 | — | 5.8 | 1.7 | 0.26 | — | — | — | — | — | — | 0.42 |
| 9 | 76.3 | 45.3 | — | 5.4 | 1.4 | 0.26 | — | — | — | — | — | — | 0.49 |
| 10 | 77.2 | 46.5 | — | 3.5 | 1.0 | 0.26 | — | — | — | — | — | — | 0.53 |
| 11 | 81.3 | 53.9 | — | 3.0 | 0.7 | 0.26 | — | — | — | — | — | — | 0.62 |
| 12 | 86.6 | 64.9 | — | 0.7 | — | 0.26 | — | — | — | — | — | — | 0.77 |
| 13 | 72.1 | 39.4 | — | 5.8 | 1.7 | 0.30 | — | — | — | — | — | — | 0.42 |
| 14 | 75.9 | 44.7 | — | 5.4 | 1.4 | 0.30 | — | — | — | — | — | — | 0.49 |
| 15 | 76.8 | 45.9 | — | 3.5 | 1.0 | 0.30 | — | — | — | — | — | — | 0.53 |
| 16 | 80.9 | 53.0 | — | 3.0 | 0.7 | 0.30 | — | — | — | — | — | — | 0.62 |
| 17 | 86.2 | 63.7 | — | 0.7 | — | 0.41 | — | — | — | — | — | — | 0.77 |
| 18 | 71.0 | 37.8 | 0.6 | 5.8 | 1.7 | 0.41 | 12.4 | 25.8 | 0.21 | 0.27 | 54.5 | 80.8 | 0.42 |
| 19 | 74.8 | 42.8 | 0.4 | 5.4 | 1.4 | 0.41 | 17.6 | 33.9 | 0.29 | 0.35 | 54.5 | 80.8 | 0.49 |
| 20 | 75.7 | 43.9 | 0.5 | 3.5 | 1.0 | 0.41 | 18.9 | 36.5 | 0.33 | 0.39 | 54.5 | 80.8 | 0.53 |
| 21 | 79.8 | 50.4 | 0.4 | 3.0 | 0.7 | 0.41 | 27.3 | 48.1 | 0.46 | 0.51 | 54.5 | 80.8 | 0.62 |
| 22 | 84.9 | 60.0 | 0.4 | 0.7 | — | 0.41 | 41.5 | 68.1 | 0.72 | 0.74 | 54.5 | 80.8 | 0.77 |

Figure 3B:
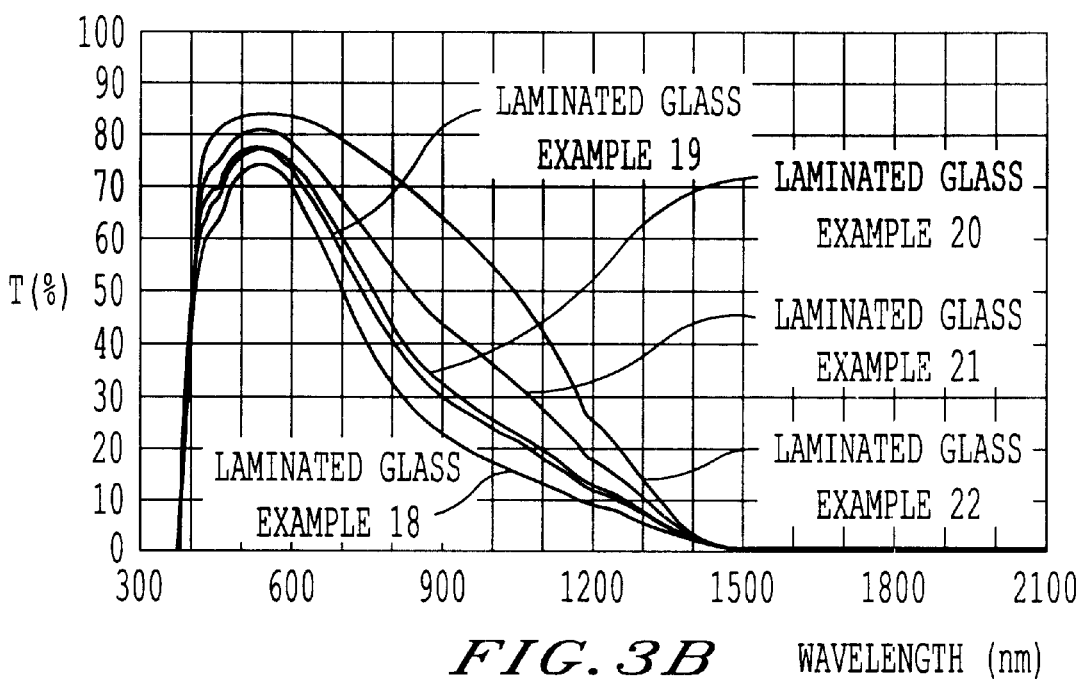
FIG. 3B is a graph of the spectral transmittances of the laminated glasses Examples 19 to 22.

FIG. 3A is a graph showing the spectral transmittances of Laminated Glass Examples 1 to 5, and FIG. 3B is a graph showing the spectral transmittances of Laminated Glass Examples 18 to 22. The ordinate of each graph denotes transmittance (%), and the abscissa denotes wavelength (nm). Table 3 clearly indicates that when the content of ITO fine particles is from 0.1 to 0.5 part by mass in relation to 100 parts by total mass of an interlayer, a laminated glass can attain a haze of at most 1%. Laminated Glass Examples 1 to 3, 8 to 10, 13 to 15 and 18 to 20 can attain solar transmittances Te of at most 50% even with low contents of ITO fine particles by virtue of the products of the solar transmittances of the respective glass sheets within the range of from 0.3 to 0.6.

When the sum of the FeO contents of the respective glass sheets in a piece of a laminated glass is from 0.5 to 2.5 mg, the laminated glass can have an infrared transmittance at a wavelength of 850 nm of at least 20% and an infrared transmittance at a wavelength of 1100 nm of at most 30% whether the content of ITO fine particles in the interlayer in a piece of the laminated glass is high or low (0.17 mg as in Interlayer Example 1 or 0.41 mg as in Interlayer Example 5). When the sum of the FeO contents of the respective glass sheets in a piece of a laminated glass is from 1 to 2 mg, and the content of ITO fine particles in the interlayer in the piece of the laminated glass is from 0.1 to 0.5 mg, the laminated glass can have an infrared transmittance at a wavelength of 1100 nm of at most 30%, an infrared transmittance at a wavelength of 850 nm of at least 20% and a solar transmittance of at most 50%.

In infrared communications between automobiles (i.e., between in-vehicle devices) moving in opposite directions, infrared rays have to go through two laminated glasses. Therefore, a slight difference in the transmittance of a laminated glass greatly affects the travel range of infrared rays. The reason will be explained by taking the cases of laminated glasses having infrared transmittances of 20%, 25.8%, 28.3% and 33.9% at 850 nm.

When an infrared ray passes a first laminated glass, the intensities of the infrared ray becomes 20%, 25.8%, 18.3% or 33.9%, respectively, depending on the transmittance of the laminated glass. If the infrared ray passes a second laminated glasses (having the same transmittance as the first laminated glass), the intensity of the infrared ray becomes 4.0% (=0.2×0.2×100), 6.7% (≈0.258×0.258×100), 8.0% (≈0.283×0.283×100) or 11.5% (≈0.339×0.339×100) of the intensity of the light source, respectively. Therefore, the intensity of an infrared ray having passed two laminated glasses is at least 5% if the laminated glasses have infrared transmittances of 25.8% at a wavelength of 850 nm, and the intensity of an infrared ray having passed two laminated glasses is at least 10% if the laminated glasses have infrared transmittances of 33.8%.

Laminated glasses having transmittances of 25.8% require a light source with only about 60% (≈4÷6.7×100) of the intensity required for laminated glasses having transmittances of 20%. Similarly, laminated glasses having transmittances of 33.9% require a light source with only about 35% (≈4÷11.5×100) of the intensity required for laminated glasses having transmittances of 20%. Therefore, laminated glasses having high transmittances allow communications even with a light source having a low intensity.

Considering the above, it is preferred that laminated glasses have transmittances of at least 25%, in particular at least 30%, at a wavelength of 850 nm. The above-mentioned transmittance can be attained when the sum of the FeO contents of the respective glass sheets in a piece of a glass sheet is from 1 to 1.5 mg, and the content of ITO fine particles in the interlayer in a piece of a laminated glass is from 0.2 to 0.4 mg.

As is evident from the above, the present invention uses glass sheets made of iron-containing soda-lime-silica glass in a laminated glass having an interlayer having infrared cutoff fine particles with diameters of at most 0.2 μm dispersed therein. Because the iron content is adjusted appropriately, it is possible to obtain a laminated glass having the desired infrared cutoff properties.

The laminated glass has a low haze by virtue of the low content of IR cutoff fine particles and hardly has a problem with the appearance when used as a windowpane. The controlled amount of IR cutoff fine particles allows transmission of infrared rays at wavelengths around 850 nm used in various infrared commutations systems (such as the VICS using light beacons and the keyless entry system). The laminated glass of the present invention can be used as a windowpane not only in automobiles but also in other transports such as aircrafts, watercrafts and trains.

The entire disclosure of Japanese Patent Application No. 2000-279881 filed on Sep. 14, 2000 including specification, claims, drawings and summary are incorporated herein by reference in its entirety.

What is claimed is:

1. A laminated glass comprising plural glass sheets and an interlayer interposed between the plural glass sheets, wherein the interlayer is an organic resin film having IR cutoff fine particles with diameters of at most 0.2 αm dispersed therein, the product of the solar transmittances of the respective glass sheets is from 0.3 to 0.6, and the content of the IR cutoff fine particles dispersed in the interlayer in from 0.1 to 0.5 parts by mass in relation to 100 parts by total mass of the interlayer;

and wherein the sum of the FeO contents of the respective glass sheets in a 1 $cm^2$ piece of the laminated glass is from 0.5 to 2.5 mg in terms of $Fe_2O_3$.

2. The laminated glass according to claim 1, wherein the solar transmittances are determined in accordance with the Japanese Industrial Standards (JIS) R3106-1998.

3. The laminated glass according to claim 1, wherein the plural glass sheets are made of soda-lime-silica glass, and the iron content of each glass is so adjusted that the product of the solar transmittances of the respective glass sheets is from 0.3 to 0.6.

4. The laminated glass according to claim 1, wherein the sum of the total iron contents of the respective glass sheets in a 1 $cm^2$ piece of the laminated glass is from 2 to 7 mg in terms of $Fe_2O_3$.

5. The laminated glass according to claim 1, wherein the diameters of the IR cutoff fine particles are from 0.001 to 0.15 μm.

6. The laminated glass according to claim 1, wherein the IR cutoff fine particles are made of one member selected from the group consisting of indium oxide doped with tin and tin oxide doped with antimony.

7. The laminated glass according to claim 1, wherein the content of the IR cutoff fine particles in the interlayer in a 1 $cm^2$ piece of the laminated glass is from 0.1 to 0.5 mg.

8. The laminated glass according to claim 1, wherein the product of the infrared transmittances of the respective glass sheets determined at a wavelength of 1100 nm in accordance with the Japanese Industrial Standards (JIS) R3106-1998 is from 0.15 to 0.5.

9. The laminated glass according to claim 1, which is an automobile windowpane.

10. The laminated glass according to claim 9, wherein the FeO content in terms of $Fe_2O_3$ of the glass sheet on the exterior side is higher than the FeO content in terms of $Fe_2O_3$ of the glass sheet on the interior side.

11. The laminated glass according to claim 1, wherein the sum of the FeO contents of the respective glass sheets in a 1 $cm^2$ piece of the laminated glass is from 1 to 1.5 mg in terms of $Fe_2O_3$, and the content of the IR cutoff fine particles in the interlayer in a 1 $cm^2$ piece of the laminated glass is from 0.2 to 0.4 mg.

12. The laminated glass according to claim 1, wherein the IR cutoff fine particles are fine particles made of a metal, an oxide, a nitride or a sulfide of Sn, Ti, Si, Zn, Zr, Fe, Al, Cr, Co, Ce, In, Ni, Ag, Cu, Pt, Mn, Ta, W, V or Mo, any of which may be doped with Sb or F.

13. The laminated glass according to claim 12, wherein the IR cutoff fine particles are a single species or more than one species of fine particles mixed or coated with an organic resin.

14. The laminated glass according to claim 1, wherein the IR cutoff fine particles are fine particles made of tin oxide doped with antimony or indium oxide doped with tin.

15. The laminated glass according to claim 1, wherein the IR cutoff fine particles are fine particles made of indium oxide doped with tin.

16. The laminated glass according to claim 1, wherein the sum of the total iron contents of the respective glass sheets in a 1 $cm^2$ piece of the laminated glass is from 3 to 6 milligrams in terms of $Fe_2O_3$.

* * * * *

UNITED STATES PATENT AND TRADEMARK OFFICE
CERTIFICATE OF CORRECTION

PATENT NO.   : 6,506,487 B2
DATED        : January 14, 2003
INVENTOR(S)  : Kuniko Nagai It is certified that error appears in the above-identified patent and that said Letters Patent is hereby corrected as shown below:

Column 4,
Line 12, delete "5000 em" and insert -- 5000 nm --

Column 12,
Line 1, delete "0.2 am" to -- 0.2µm --

Signed and Sealed this

Twenty-sixth Day of August, 2003

JAMES E. ROGAN
*Director of the United States Patent and Trademark Office*